United States Patent [19]

Ladine

[11] 3,821,520

[45] June 28, 1974

[54] METHOD OF READING PUNCHED TAPE AND APPARATUS FOR SAME

[75] Inventor: Duane A. Ladine, Glendale, Calif.

[73] Assignee: Enviro-Labs, Inc., Glendale, Calif.

[22] Filed: Apr. 25, 1973

[21] Appl. No.: 354,229

[52] U.S. Cl. .......................... 235/61.11 E, 250/557

[51] Int. Cl. .......................... G06k 7/10, G08c 9/06

[58] Field of Search 235/61.11 R, 61.11 E, 61.11 A, 235/61.11 C; 178/17 A, 17 B; 226/9, 79, 86; 250/555, 557, 566

[56] References Cited

UNITED STATES PATENTS

| | | | |
|---|---|---|---|
| 3,051,381 | 8/1962 | Drillick | 235/61.11 C |
| 3,064,887 | 11/1962 | Waters et al. | 235/61.11 E |

*Primary Examiner*—Daryl W. Cook
*Attorney, Agent, or Firm*—Gene W. Arant

[57] ABSTRACT

The method of reading a punched tape at a set of information hole locations that correspond to an alignment hole location, which consists in detecting the arrival at a reading station of the leading edge of the alignment hole, thereafter driving the tape forward a plurality of incremental distances each of which corresponds to a rather small fraction of the width of an information hole, and then reading the tape at the set of information hole locations. The method is also applied in conjunction with a tape having a pair of alignment hole channels by sensing the arrival at the reading station of the leading edge of the alignment hole in each channel and then reading the tape at a location determined in part as a function of any skewed relationship that may exist in the tape.

19 Claims, 2 Drawing Figures

METHOD OF READING PUNCHED TAPE AND APPARATUS FOR SAME

BACKGROUND OF THE INVENTION

In utilizing punched tape to store binary information there is a risk of error which is created by the method of punching the information holes into the tape in the first instance. More specifically, any punching apparatus that is used has a limit as to its mechanical accuracy. In reading the tape, therefore, any slight error in location of an information hole may possibly result in a failure to read or detect that hole.

According to the present invention the punched tape that is to be read is driven forward in rather small incremental distances each of which corresponds to a rather small fraction of the width of an information hole. By appropriate sensing of the tape position, and appropriate selection of the number of incremental drive distances to use, it then becomes possible to read the tape rather precisely at the optimum reading position.

The present invention is an improvement over that shown in the prior co-pending application, Ser. No. 146,092 filed May 24, 1971, by Duane A. Ladine and Lester E. McCullough, and which is now U.S. Pat. No. 3,745,312.

Thus, the sole object and purpose of the invention is to provide an improved method for reading punched tape, in order to minimize or eliminate the possibility of error in the digital information that is being read.

DRAWING SUMMARY

Figure 1:
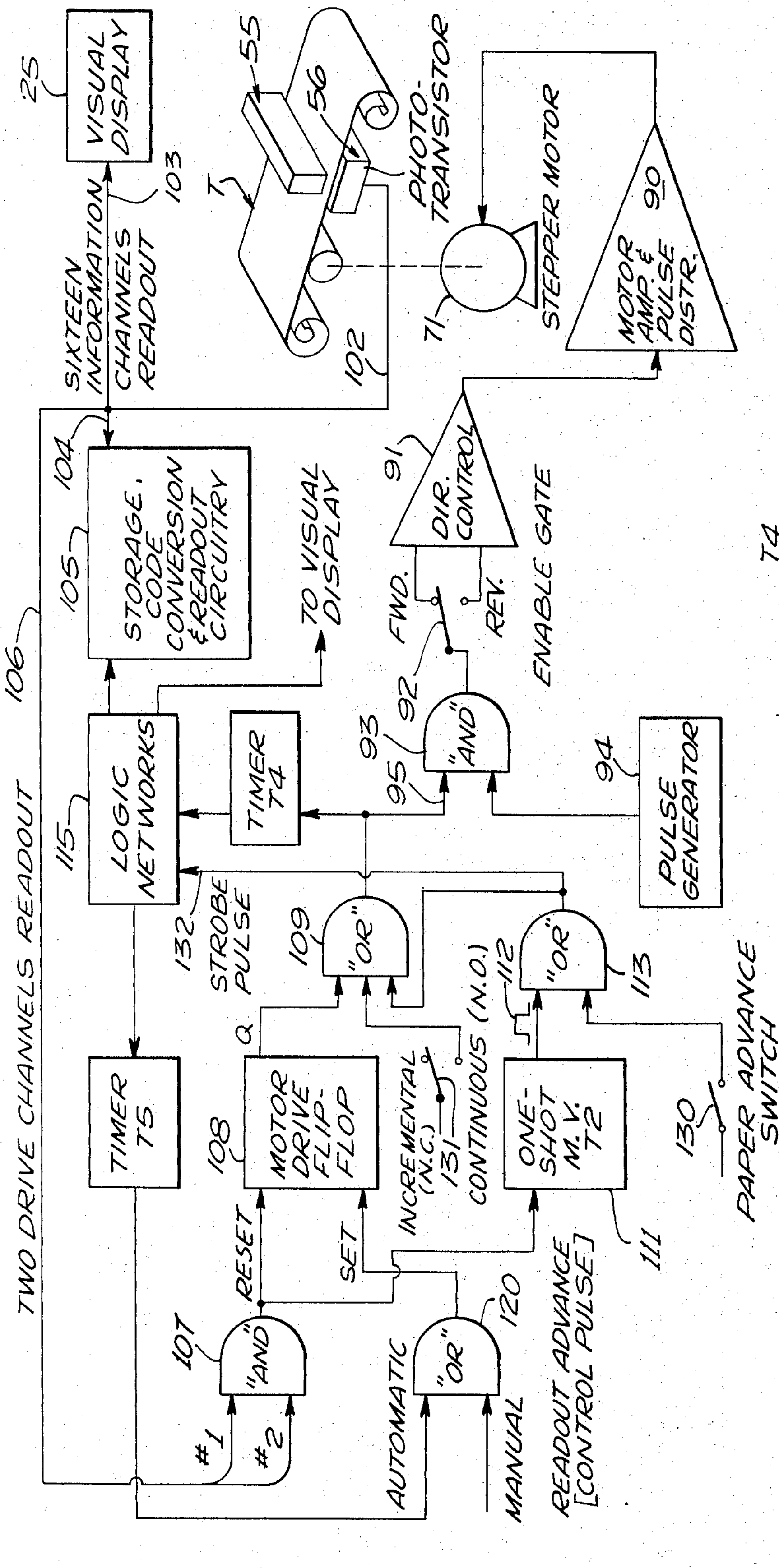
Figure 2:
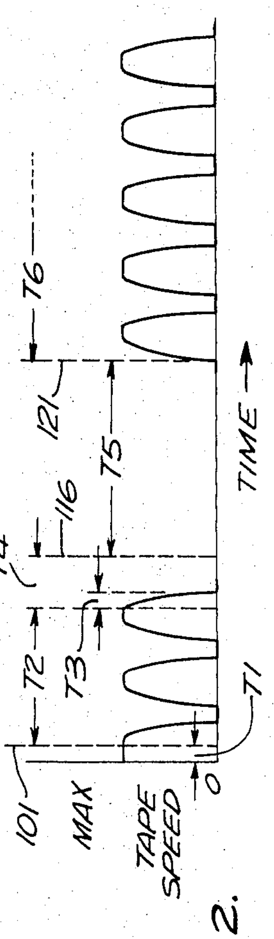

FIG. 1 is a schematic diagram of the control circuit for the presently preferred form of my invention; and FIG. 2 is a time diagram which illustrates the time relationships involved when the tape is stopped before reading an information frame from it.

PREFERRED EMBODIMENT

In the prior co-pending application, Ser. No. 146,092, now U.S. Pat. No. 3,745,312, the method and apparatus which are specifically illustrated involve stopping the tape before the information frame is read. In certain applications that procedure is advantageous. In other applications, however, it is preferable to read the information frame while the tape is moving, thus avoiding the necessity for mechanically stopping and mechanically re-starting the movement of the tape.

In the U.S. Pat. No. 3,745,312, referred to above, it is stated that "The tape may be advanced continuously and the holes read while the tape is moving". The specific method for accomplishing that operation was not, however, specifically disclosed in that patent. The disclosure of the patent is incorporated herein by reference.

In the drawing of the present application FIG. 2 is identical to FIG. 14 of the patent.

In the drawing of the present application FIG. 1 includes all the information that is contained in FIG. 13 of the above identified patent. In addition, FIG. 1 illustrates additional circuitry which may be used for reading the tape without stopping the movement of the tape.

Thus, in FIG. 1 there is shown a switch 131 whose input terminal is supplied from a power source, the same as the input terminal for paper advance switch

130. Switch 131 has a NORMALLY CLOSED CONTACT identified as "incremental (N.C.)". It also has a NORMALLY OPEN CONTACT identified as "continuous (N.O.)". The output of the N.O. contact is applied as an input of the "OR" Gate 109. When switch 131 is in the N.C. position the circuit operation is the same as described in my above identified patent.

However, when switch 131 is in the N.O. position the "OR" Gate 109 stays in a "binary 1" condition which in turn causes the "AND" Gate 93 to remain in its enabling state, which in turn causes the output of pulse generator 94 to be applied continuously for controlling operation of motor 71.

The circuit of FIG. 1 also includes a second output taken from "OR" Gate 113 which is labeled as STROBE PULSE 132. The STROBE PULSE 132 is applied as an additional input to LOGIC NETWORKS 115. The trailing edge of pulse 132 allows data from phototransistors 102 to be entered or transferred into the storage and code conversion circuitry 105. The circuit is thereby able to read data from the punched tape at the appropriate position of an information frame of data holes over the sensing station, even though the stepping motor is driven continuously.

The present invention may be applied to a punched tape having a single alignment hole channel, in which case the number of incremental drive pulses applied to the stepper motor 71 after the arrival of the leading edge of the alignment hole and before reading the information frame is calculated to place the exact center of all the information holes as close as possible to the reading station before the reading of the information takes place.

Alternatively, the method of the present invention may be applied when the punched tape has two alignment hole channels. In that event the leading edges of both alignment holes are sensed at their arrival at the reading station, the difference in arrival times indicates any skewing that may exist in the tape and the incremental pulses applied to stepper motor 71 are calculated to provide the optimum position of the tape before the information frame is read.

While my invention has been described in detail in at least one of its forms, in order to comply with the patent laws, it will be understood that the breadth and scope of my invention are to be limited only by the following claims.

I claim:

1. The method of reading information from a punched tape having an alignment hole channel and also having a plurality of information hole channels providing successive frames of information, each of which frames is punched in the tape in rather precise alignment with a corresponding one of the alignment holes, comprising the steps of:

a. driving the tape past a row of sensing locations in substantially perpendicular alignment thereto;
b. sensing the appearance of an alignment hole opposite a respectively associated one of the sensing locations;
c. thereafter driving the tape an additional distance corresponding to a portion of the width of an alignment hole, and then stopping it;
d. and after the tape is stopped, reading an information frame through the remaining sensing locations of said row.

2. The method of claim 1 wherein the tape has a laterally separated pair of alignment hole channels, each information frame is punched in rather precise alignment with a corresponding pair of alignment holes, and the concurrent appearance of a pair of alignment holes opposite a respectively associated pair of the viewing windows is sensed before stopping the tape.

3. The method of claim 2 wherein the tape is driven said additional distance after sensing said pair of alignment holes.

4. The method of claim 1 wherein the width of an alignment hole is much greater than the width of a viewing window.

5. The method of reading information from a punched tape having a laterally separated pair of alignment hole channels and also having a plurality of information hole channels providing successive frames of information, each of which frames is punched in the tape in rather precise alignment with a corresponding pair of the alignment holes, comprising the steps of:

a. driving the tape past a row of viewing windows in substantially perpendicular alignment thereto;

b. sensing the arrival of the leading edges of both of a pair of alignment holes opposite a respectively associated pair of the viewing windows;

c. thereafter driving the tape an additional distance corresponding to a portion of the width of an alignment hole, and then stopping it so that the approximate centers of the alignment holes are opposite the associated windows;

d. and after the tape is stopped, reading an information frame through the other viewing windows.

6. The method of claim 5 wherein the width of an alignment hole is much greater than the width of a viewing window.

7. The method of claim 5 wherein some of said information hole channels lie outside of said alignment hole channels.

8. The method of claim 7 wherein the width of an alignment hole is much greater than the width of a viewing window.

9. A method of reading a punched tape which has an alignment hole channel and a plurality of information hole channels therein, the punched holes of each information frame being rather precisely aligned with a corresponding alignment hole, comprising the steps of:

selecting a row of viewing windows each having a width which is substantially less than the alignment hole width;

applying discrete increments of driving energy for driving the tape past the row of windows, each increment of energy being sufficient to drive the tape a distance corresponding to a small fraction of the width of a viewing window;

sensing the arrival of the leading edge of an alignment hole at the associated viewing window;

applying a number of additional increments of driving energy sufficient to move the tape until the approximate center of said alignment hole is opposite its viewing window;

and then stopping the tape and reading the information frame.

10. Apparatus for reading a punched tape having a spaced parallel pair of alignment hole channels and a plurality of information hole channels arranged parallel to said alignment hole channels with the information holes of each information frame being rather precisely aligned with a corresponding pair of the alignment holes, comprising:

a. a row of viewing windows disposed substantially perpendicular to the direction of movement of the tape;

b. means for aligning the tape so that said pair of alignment hole channels pass over a respectively associated pair of viewing windows, and each of said information hole channels passes over a respectively different one of said windows;

c. normally energized drive means for driving the tape past said windows;

d. an electrical "and" circuit coupled to said pair of viewing windows and responsive to the concurrent arrival of a pair of the alignment holes for producing a control signal;

e. time delay means coupled between said "and" circuit and said drive means and responsive to said control signal for de-energizing said drive means after a time delay which corresponds to movement of the tape through a portion of the width of an alignment hole;

f. electrical circuit means coupled to the other viewing windows for reading the information channels; and g. circuit means for inhibiting the operation of said reading circuit means until after movement of the tape has stopped.

11. In a tape reader circuit for reading punched tape, tape drive apparatus comprising:

a friction drive roll adapted to engage one surface of the tape;

a stepper motor mechanically coupled to said friction drive roll for rotationally driving the same, said stepper motor being responsive to a series of discrete pulses for rotating a predetermined angular distance in response to each such pulse;

a clock pulse generator for applying pulses to said motor;

means for sensing the tape position; and a gating circuit coupled to said sensing means and responsive to the position of the tape for selectively gating the pulses from said clock pulse generator to said motor.

12. The method of reading a punched tape having a plurality of information hole channels and also having an alignment hole channel in which each alignment hole is aligned with a set of the information hole locations, comprising:

while the tape is moving, sensing the arrival of the leading edge of an alignment hole at a predetermined sensing location;

thereafter driving the tape forward a plurality of incremental distances each of which corresponds to a rather small fraction of the width of an information hole, said plurality of incremental distances cumulatively corresponding to less than the width of an information hole; and then stopping the tape so that the set of information hole locations aligned with said alignment hole can be read.

13. The method claimed in claim 12 wherein said plurality of incremental distances correspond to about half the width of an information hole.

14. The method of controlling a punched tape having a plurality of information hole channels providing successive sets of information, and also having a pair of alignment hole channels such that each pair of alignment holes correspond to a set of the information holes, comprising the steps of:

driving the tape past a transversely arranged row of viewing windows;

sensing the arrival at the respective viewing windows of the leading edges of a pair of alignment holes; and then stopping the tape at a longitudinal position which is determined in part as a function of any skewing that may exist in the tape.

15. The method of reading information from a punched tape having an alignment hole channel and also having a plurality of information hole channels providing successive frames of information, each of which frames is punched in the tape in rather precise alignment with a corresponding one of the alignment holes, comprising the steps of:

a. driving the tape past a row of sensing locations in substantially perpendicular alignment thereto;

b. sensing the appearance of an alignment hole opposite a respectively associated one of the sensing locations;

c. thereafter driving the tape an additional distance corresponding to a portion of the width of an alignment hole;

d. and then reading an information frame through the remaining sensing locations of said row.

16. The method of claim 15 wherein the tape has a laterally separated pair of alignment hole channels, each information frame is punched in rather precise alignment with a corresponding pair of alignment holes, and the concurrent appearance of a pair of alignment holes opposite a respectively associated pair of the viewing windows is sensed before reading the tape.

17. The method of claim 16 wherein the tape is driven said additional distance after sensing said pair of alignment holes.

18. The method of reading a punched tape at a set of information hole locations that correspond to an alignment hole location, which consists in detecting the arrival at a reading station of the leading edge of the alignment hole, thereafter driving the tape forward a plurality of incremental distances each of which corresponds to a rather small fraction of the width of an information hole, and then reading the tape at the set of information hole locations.

19. The method of claim 18 wherein the punched tape has a pair of alignment holes corresponding to each set of information hole locations, wherein the arrival at the reading station of the leading edge of each alignment hole is detected, and wherein the number of said incremental distances is determined in part as a function of any skewing that may exist in the tape.

* * * * *